United States Patent Office 3,574,124
Patented Apr. 6, 1971

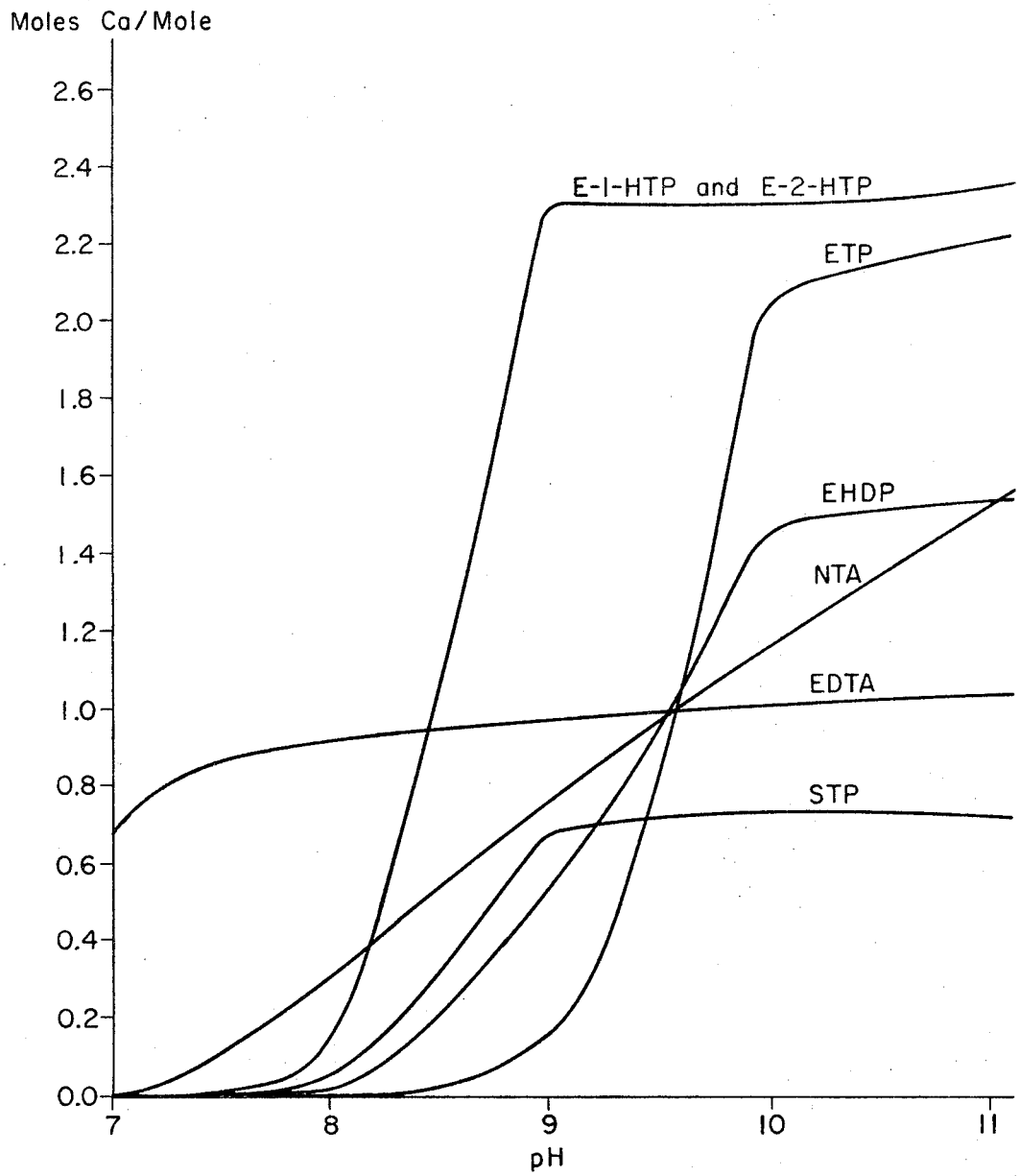

3,574,124
DETERGENT REMOVABLE CLEANING AND
POLISHING COMPOSITION
Warren I. Lyness, Mount Healthy, and Lawrence R. Parks, Springfield Township, Hamilton County, Ohio, assignors to The Procter & Gamble Company, Cincinnati, Ohio
Continuation-in-part of application Ser. No. 638,044, May 12, 1967. This application Apr. 12, 1968, Ser. No. 721,037
Int. Cl. C11d 1/18, 1/38, 1/50, 3/26, 7/32
U.S. Cl. 252—153          9 Claims

ABSTRACT OF THE DISCLOSURE

A detergent removable, aqueous cleaning and polishing composition comprising a polymer having an acid number ranging from about 10 to about 60, a water-soluble calcium, magnesium, barium, or strontium compound, a phosphonate chelating agent selected from the group consisting of ethane-1-hydroxy-1,1,2-triphosphonic acid (E-1-HTP), ethane-2-hydroxy-1,1,2-triphosphonic acid (E-2-HTP), ethane - 1 - hydroxy - 1,1 - diphosphonic acid (EHDP) and ethane - 1,1,2 - triphosphonic acid (ETP), and sufficient volatile base to adjust the pH of the formulation to from about 9 to about 12.

---

This application is a continuation-in-part of applicants' copending application, Ser. No. 638,044, filed May 12, 1967 and now abandoned, for Detergent Removable Cleaning and Polishing Composition.

FIELD OF THE INVENTION

This invention relates to an aqueous cleaning and polishing composition which, when applied to a substrate, e.g., a tile floor, is resistant to water spotting yet is self removable or removable with ordinary detergent compositions. More particularly, this invention relates to a stable, aqueous cleaning and polishing composition comprising a polymer having an acid number of from about 10 to about 60, a water-soluble calcium, magnesium, barium, or strontium compound, a chelating agent selected from the group consisting of ethane-1-hydroxy-1,1,2-triphosphonic acid (E-1-HTP), ethane-2-hydroxy-1,1,2-triphosphonic acid (E-2-HTP), ethane-1-hydroxy-1,1-diphosphonic acid (EHDP), and ethane-1,1,2-triphosphonic acid (ETP), and sufficient volatile base to raise the pH of the composition to from about 9 to about 12.

PRIOR ART

At the present time, three types of floor polishing compositions are available. The "regular floor polishes," the first type, contain no cleaning agents. The polish films formed from these polishes are not cross-linked, are very difficult to remove from floors and are resistant to water spotting. These polishes build up on the floor with concomitant yellowing effects. Additionally, the floor must be thoroughly cleaned before application of these polish compositions.

The second type, the "wax cleaners," can be utilized in cleaning a floor while simultaneously applying a polish coating. Significant amounts of time and effort can be saved by using these compositions. However, these compositions are very susceptible to water spotting. In many instances, water swells the polish film and reactivates the cleaning agents. The resultant effect is hazing or discoloration of the polish film, i.e., water spotting.

The third type of polish composition is the polymeric cross-linked, water and detergent resistant polish. These compositions do not contain cleaning agents, are not susceptible to water spotting and are not removable with ordinary detergent compositions. They are removable with ammounium hydroxide or other strong base. However, these films, even with the aid of ammonium hydroxide, are difficult to remove. Therefore, these films exhibit a tendency to build up on the substrate with concomitant yellowing effects. When these polish films build up, they are also susceptible to chipping and peeling.

Prior art which illustrates that polymers containing carboxyl groups can be cross-linked by multivalent metal ions in the manner above described is exemplified by Uelzmann, U.S. Pat. 2,904,526, issued Sept. 15, 1959. This patent describes a zinc ammonia polymer complex prepared by the emulsion polymerization of $C_{1-3}$ alkyl acrylate with acrylic or methacrylic acid. This copolymer is dissolved in ammonium hydroxide and cross-linked with zinc oxide or zinc hydroxide at room temperature. The resulting film is water insoluble and alkali resistant. Other patents relating to the cross-linking of polymers containing carboxyl groups are as follows: Kolb, U.S. Pat. 2,959,821, issued Nov. 15, 1960; Bashaw et al., U.S. Pat. 3,090,736, issued May 21, 1963; and Rogers et al., U.S. Pat. 3,308,078, issued Mar. 17, 1967.

SUMMARY OF THE INVENTION

The cleaning and polishing composition of the present invention has several advantages over those polishes described in the prior art. The cleaning and polishing composition of this invention contains an effective cleaning agent yet the polish film is resistant to water spotting. The polish film can, therefore, be damp mopped with water to remove surface soil without detrimental effects. This polish film is, however, easily and quickly removed with subsequent applications of the cleaning and polishing composition of with ordinary detergent compositions. The problems with discoloration due to polish build up, and chipping and peeling of the polish film illustrated in use of the polymeric cross-linked polish compositions hereinbefore described can easily be avoided by removing the film with subsequent applications of the cleaning and polishing composition or with ordinary detergents.

These and other advantages which will become apparent from reading the specification are obtained with the aqueous cleaning and polishing composition of this invention which comprises, by weight of the composition:

(1) from about 5% to about 30% of a polymer having an acid number ranging from about 10 to about 60;

(2) from about 0.005% to about 0.3% of a cross-linking agent selected from the group consisting of water-soluble calcium, magnesium, barium, and strontium compounds;

(3) from about 0.2% to about 1.2% of a phosphonate chelating agent selected from the group consisting of ethane-1-hydroxy-1,1,2-triphosphonic acid (E-1-HTP), ethane-2-hydroxy-1,1,2-triphosphonic acid (E-2-HTP), ethane-1-hydroxy-1,1-diphosphonic acid (EHDP), and ethane-1,1,2-triphosphonic acid (ETP);

(4) from about 65% to about 90% of water; and (5) sufficient volatile base to adjust the pH of the composition to from about 9 to about 12.

The components of the composition of this invention and the amounts in which they are used are more fully described hereinafter.

DRAWING

The drawing attached hereto illustrates the calcium sequestering capacities of E-1-HTP, E-2-HTP, EHDP, ETP, ethylene-diaminetetraacetic acid (EDTA), nitrilo-triacetic acid (NTA) and sodium tripolyphosphate (STP) in aqueous solutions at 25° C. It is evident from this drawing that E-1-HTP, E-2-HTP, EHDP, and ETP are very efficient chelating agents at high pH's, i.e., above 9 for E-1-HTP and E-2-HTP and about 10 for EHDP and ETP.

It is also evident from this drawing that EHDP and ETP rapidly lose their sequestering capacity between pH 10 and pH 8 while E-1-HTP and E-2-HTP lose their sequestering capacity between pH 9 and pH 8. E-1-HTP, E-2-HTP, EHDT, and ETP have only minimal sequestering capacity at pH 7. EDTA and NTA do not exhibit this rapid loss of sequestering capacity in the pH range of from about 8 to about 10 while STP is not sufficiently soluble in water for use herein.

DESCRIPTION OF THE COMPOSITION

The polymers described hereinafter are the primary film forming ingredients in the cleaning and polishing composition of this invention. These polymers contribute substantially to film performance, including properties such as hardness, gloss and durability, and also contribute to the chemical resistance and the controlled removability characteristics of the film.

Polymers suitable for use in the cleaning and polishing composition of this invention are polycarboxylic polymers and must have acid numbers ranging from about 10 to about 60, preferably from about 10 to about 30. When polymers having acid numbers below 10 are utilized herein, the polish film is susceptible to water spotting because of inadequate cross-linking of the polymers. When polymers having acid numbers over 60 are used herein, the cleaning and polishing composition is generally unstable and the composition may coagulate or gel prior to application to the substrate. The acid number, as used herein, is defined as the number of milligrams of potassium hydroxide necessary to neutralize 1 gram of a sample, e.g., 1 gram of polymer.

These polymers are formed from polymerizable ethylenically unsaturated monomers. The monomers which generally supply the carboxyl groups, and thus the acid numbers, to the polymers of this invention are methacrylic acid, acrylic acid or mixtures thereof. Acrylic acid is, however, somewhat difficult to work with and, therefore, methacrylic acid is preferred for use herein. These monomers containing carboxyl groups provide the requisite functionality to the polymer which is necessary to obtain polymer-calcium, magnesium, barium and/or strontinum ion bonding during film formation. The carboxyl groups also play a key role in removal of the film. (Film formation and removal are more thoroughly explained hereinafter.) It is therefore apparent that the presence of these carboxyl-containing monomers in the polymer used herein is critical to the proper functioning of the composition of this invention.

In order to form a polish film having appropriate film properties, e.g., hardness and flexibility, and to prevent softening of the polish film by the action of tile plasticizers, other ethylenically unsaturated monomers which do not contain carboxyl groups are generally included as a major portion of the polymers used herein. Specific example of these ethylenically unsaturated carboxyl-free monomers include styrene, acrylonitrile, vinyl toluene, acrylates such as 2-ethylhexyl acrylate and ethyl acrylate, and methacrylates such as ethylmethylacrylate, methylmethacrylate and butylmethacrylate.

The polymers used herein generally comprise, on a weight basis, from about 65% to about 95%, preferably from 75% to about 95% of the above-described carboxyl-free monomers. The carboxyl-containing monomers hereinbefore described generally comprise from 5% to 35% of the polymers used herein, and preferably comprise from about 5% to 25% of the polymers.

The general formula of the polymers used herein is as follows:

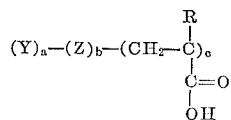

wherein Y is an acrylate such as 2-ethylhexyl acrylate or ethyl acrylate, or like or similar compounds; Z is styrene, acrylonitrile, vinyl toluene or methacrylates such as ethylmethacrylate, methylmethacrylate or butylmethacrylate, or like or similar compounds; and R is either hydrogen or methyl. The subscripts, $a$, $b$ and $c$, are so selected as to obtain a total molecular weight of between about 44,000 and 1,000,000 as explained hereinafter. Additionally, the subscripts, $a$ and $b$, are so selected that the combination of Y and Z equal from about 65% to about 95%, preferably from 75% to 95%, of the total weight of the polymer. Subscript $c$ is so selected that acrylic acid, methacrylic acid or mixtures thereof comprise from 5% to 35%, preferably from 5% to 25%, of the total weight of the polymers.

A preferred polymer for use herein comprises from about 5% to about 15% of methacrylic acid, from about 10% to about 70% of ethylacrylate, butylacrylate or mixtures thereof, and from about 10% to about 70% of styrene, methylmethacrylate, acrylonitrile or mixtures thereof. This composition has an acid number ranging from about 10 to about 30, and can easily be prepared by emulsion polymerization. Emulsion polymerization is a well-known process and is described in Zdanowski, Canadian Pat. 749,438, page 5, lines 19 through 31.

The polymers used herein can be generally described as high molecular weight substances. The molecular weight of these polymers ranges from about 44,000 to about 1,000,000. It should be understood, however, that the molecular weight of these polymers is not critical. Rather it is essential that these polymers contain sufficient carboxyl groups to have an acid number of from about 10 to about 60 and form stable emulsions of polymer particles. For a more complete discussion of suitable polymers for use herein see U.S. Pat. 3,308,078 at column 5, line 5, through column 11, line 54. This discussion is incorporated herein by reference.

The polymers described above are present in the aqueous cleaning and polishing composition in this invention in amounts ranging from about 5% to about 30% and preferably, from about 8% to about 12%, by weight of the composition.

Another essential component of this composition is calcium, magnesium, barium, and/or strontium ions. The calcium, magnesium, barium, and/or strontium ions are the primary cross-linking agents in the polish composition of this invention. When the polish film is cast for example, on a hard surface such as a floor, and these ions are released, as discussed hereinafter, each calcium, magnesium, barium, or strontium ion is bonded to two separate carboxyl groups thus cross-linking the film. Calcium, magnesium, barium, and strontium ions are used exclusively herein to obtain polish films which are resistant to water spotting yet are easily removable with ordinary detergents. Other metal ions, such as zinc and zirconium ions are unsatisfactory for this purpose as these ions form strong bonds with the carboxyl groups. These bonds or linkages are not rupturable with ordinary detergents or the polish composition per se and the polish films are, therefore, subject to the problems of polish build up, chipping and peeling. The monovalent metals, e.g., sodium and potassium, will not cross-link the polymers used herein and the polish film is thus subject to water spotting.

From about 0.005% to about 0.3%, preferably from about 0.015% to about 0.075% of water-soluble calcium, magnesium, barium, or strontium compounds are added to the cleaning and polishing composition of this invention to provide sufficient ions to cross-link the hereinbefore described polymer. Especially preferred water-soluble compounds for use herein are calcium and magnesium chlorides. Other water-soluble calcium, magnesium, barium or strontium compounds can be substituted for calcium and magnesium chloride and are considered to be equivalents therewith if they introduce the hereinbefore defined requisite amount of these ions. These other water-soluble compounds include calcium, magnesium, barium, and strontium hydroxide, nitrate and acetate.

The third required ingredient in the composition of this invention is a phosphonate detergency builder and chelating agent selected from the group consisting of ethane-1-hydroxy-1,1,2-triphosphonic acid (E-1-HTP), ethane-2-hydroxy-1,1,2-triphosphonic acid (E-2-HTP), ethane-1,1,2-triphosphonic acid (ETP) and ethane-1-hydroxy-1,1-diphosphonic acid (EHDP). These phosphonate chelating agents serve a dual function. They act as very efficient cleaning agents and they also sequester large amounts of calcium, magnesium, barium, and strontium ions at pH's above 10 in the case of EHDP and ETP and above 9 in the case of E-1-HTP and E-2-HTP. These chelating agents exhibit sharp and definite break points in sequestering capacity between pH 10 and pH 8. This definite break point in sequestering capacity is very important to the proper functioning of this invention As the chelating agents sequester the calcium, magnesium, barium, and strontium ions above a pH of about 10 in the case of EHDP and ETP and 9 in the case of E-1-HTP and E-2-HTP, no cross-linking is evident in the aqueous cleaning and polishing composition of this invention prior to application to the substrate However, when the cleaning and polishing composition is applied to the substrate, and the pH drops due to evaporation of the volatile base and absorption of carbon dioxide from the air, the phosphonate chelating agents release the calcium, magnesium, barium, and/or strontium ions. These ions are released quickly and completely and are thus available for bonding with the carboxyl groups of the polymer. Because these phosphonate chelating agents are ineffective sequestrants below a pH of 8, the polish film can be damp mopped to remove surface soil without concomitant water spotting. However, the polish film is easily removed with subsequent applications of the cleaning and polishing composition or with ordinary aqueous solutions of detergents. The detergents introduce a relatively high pH medium in which E-1-HTP, E-2-HTP, EHDP and ETP act as effective chelating agents. These chelating agents, thus, resequester the calcium, magnesium, barium, and/or strontium ions and destroy the cross-linking effect.

If other chelating agents such as EDTA, NTA or STP are used herein, deficiencies in the cleaning and polishing composition and/or in the polish film will be noted. For example, these chelating agents are generally not as effective in sequestering calcium, magnesium, barium, or strontium ions as are E-1-HTP, E-2-HTP, EHDP and ETP. Therefore, larger amounts of these chelating agents generally must be used in a polish composition to obtain comparable advantages. Polish compositions containing EDTA will water spot badly because EDTA is about as effective in sequestering calcium, magnesium, barium, and strontium ions at pH 7 as at the higher pH's. Use of NTA in the cleaning and polishing composition may result in (1) a polish film which is difficult to remove with subsequent applications of the composition or with ordinary detergents, or (2) a polish film which water spots easily. The polish film which is difficult to remove results because NTA exhibits no definite break point in sequestering capacity. Small increases in pH do not reactivate the chelating agent and, thus, do not cause removal of the cross-linking agents from the polymer film. The film remains cross-linked and very difficult to remove. The polish film which water spots easily is the result of inadequate cross-linking because the NTA releases calcium, magnesium, barium, and strontium ions throughout the drying and hardening of the polish film. The polymers cross-link slowly and thus prevent migration of the calcium, magnesium, barium, and strontium ions to the cross-linking sites. These inadequately cross-linked polymers are very susceptible to water spotting. The introduction of sodium ions with STP will cause precipitation of complexes in the polish composition which, of course, is undesirable.

To obtain the advantages of this invention, the above-described phosphonate chelating agents should be used in this invention in amounts ranging from 0.2% to about 1.2%. It is preferred, in order to obtain excellent cleaning benefits, that the phosphonate chelating agents comprise from about 0.5% to about 1.2% of the total composition.

A volatile base is another required component of the polish composition of this invention. The volatile base is utilized primarily to raise the pH of the polish composition sufficiently to obtain high sequestering capacity from the chelating agents. When EHDP or ETP is utilized herein the pH should be raised to at least 10 and when E-1-HTP or E-2-HTP are utilized herein, the pH should be raised to at least 9. In addition to this function, raising the pH of the cleaning and polishing composition adds substantially to the cleaning properties of the composition. It is preferred that the pH of the composition range from about 9.5 to about 12.

The volatile base preferred for use herein is ammonium hydroxide, however, other volatile amine bases can also be used herein, e.g., morpholine and ethanolamine.

The final essential component of this cleaning and polishing composition is water. The composition is generally comprised of from about 65% to about 90% of water. Preferably, the composition contains from about 75% to about 85% water.

The cleaning and polishing composition of this invention generally and preferably contains optional components which add to the desirability and utility of this composition. Among these optional components are alkali soluble resins containing carboxyl groups and having a molecular weight of up to about 10,000, such as (1) condensation type resins having an acid number ranging from about 120 to about 220, (2) addition type resins having an acid number from about 140 to about 300 containing at least two ethylenically unsaturated monomers, and (3) mixtures of said condensation type resins and addition type resins. Examples of these resins are set forth in U.S. Pat. 3,308,078 in columns 13, 14, 15 and 16.

Polyethylene waxes can also be added to the composition of this invention. These polyethylene waxes add durability and flexibility to the floor polish composition of this invention. These polyethylene waxes are commercially available and examples of these commercial products include "A–C polyethylene 629," "A–C polyethylene 729," "A–C polyethylene 630" and "Epolene E."

In general these polyethylene waxes comprise mildly oxidized polyethylene in which oxygen has been introduced into the molecule, presumably in the form of carboxyl groups, without materially altering the molecule in other respects. They are generally characterized by an essentially polyethylenic structure formed of recurring methylene groups, by a molecular weight between about 1000 to about 5000, by an oxygen content between about 1% to about 17%, by a hardness equal to a penetration of not more than 1.5 mm. as measured by standard ASTM method D–5–25, by a toughness equal to at least 2 foot pounds per linear inch as measured by a standard ASTM method D–256–47–P, and by a low ratio of saponification number to acid number.

Various leveling and coalescing agents are generally used in floor polish compositions and can be utilized in the composition of this invention. Excellent anionic fluorochemical leveling agents, e.g., FC–128, are described in Geen, U.S. Pat. 2,937,098. (This reference is incorporated herein by reference.) Tributoxyethylphosphate and various well-known nonionic surface active agents can also be used as leveling agents in the composition of this invention. Ethylene glycol and mono- and dialkyl ethers of diethylene glycol wherein the alkyl group contains from 1 to about 4 carbon atoms, e.g., Carbitol, can be added to the composition of this invention to help control the drying characteristics of the polish film, as well as to control the freeze-thaw characteristics of the aqueous cleaning and polishing composition.

The preferred detergent removable cleaning and polishing composition of this invention, which is particularly adapted to polishing floors and which contains these optional components, comprises on a weight basis:

(1) from about 5% to about 30% of a polymer having an acid number ranging from about 10 to about 60;
(2) from 0% to about 5% of the hereinbefore described resins;
(3) from 0% to about 5% of the hereinbefore described polyethylene;
(4) from about 0.005% to about 0.3% of a crosslinking agent selected from the group consisting of water-soluble calcium, magnesium, barium, and strontium compounds;
(5) from about 0.2% to about 1.2% of a phosphonate chelating agent selected from the group consisting of ethane - 1 - hydroxy-1,1,2-triphosphonic acid (E-1-HTP), ethane - 2 - hydroxy-1,1,2-triphosphonic acid (E-2-HTP), ethane-1-hydroxy - 1,1 - diphosphonic acid (EHDP), and ethane-1,1,2-triphosphonic acid (ETP);
(6) from about 0% to about 0.01% of a fluorochemical leveling agent hereinbefore described;
(7) from 0% to about 1% of mono- and/or dialkyl ether of diethylene glycol wherein the alkyl group contains from 1 to about 4 carbon atoms;
(8) from 0% to about 1% of ethylene glycol;
(9) from 0% to about 1.5% of tributoxyethylphosphate;
(10) from about 65% to about 90% water; and
(11) sufficient volatile base to raise the pH of the composition to from about 9 to about 12.

The most preferred detergent removable cleaning and polishing composition is comprised of, on a weight basis:

(1) from about 8% to about 12% of a polymer having an acid number ranging from about 13 to about 17;
(2) from about 2.0% to about 2.8% of the hereinbefore described resins;
(3) from about 1% to about 2% of the hereinbefore described polyethylene;
(4) from about 0.01% to about 0.075% of calcium and/or magnesium chloride;
(5) from about 0.50% to about 0.70% of a phosphonate chelating agent selected from the group consisting of E-1-HTP, E-2-HTP, EHDP, and ETP;
(6) from about 0.002% to about 0.005% of a fluorochemical leveling agent;
(7) from 0.5% to about 0.7% of the monoethyl ether or diethyl ether of diethylene glycol;
(8) from 0.5% to about 0.7% of ethylene glycol;
(9) from 0.65% to about 0.85% of tributoxyethylphosphate;
(10) from about 75% to about 85% water; and
(11) sufficient volatile amine base to raise the pH of the composition to from about 9.5 to about 12.

PREPARATION OF THE COMPOSITION

The components of this invention can be mixed in any order. It is generally preferred, however, that the following mixing sequence be followed.

The polymer emulsion is placed in a mixing tank equipped with a stirring apparatus. Aqueous emulsions of the resin component and the polyethylene are separately prepared. The resin emulsion is slowly added to the polymer emulsion. Subsequently, the polyethylene emulsion is added. The mono- and/or dialkyl ethers of diethylene glycol, the ethylene glycol, tributoxyethylphosphate and fluorochemical leveling agent are each diluted with at least an equal weight amount of water and added to the above emulsion. A separate aqueous solution of the water-soluble calcium, magnesium, barium, and/or strontium compound and E-1-HTP, E-2-HTP, EHDP and/or ETP is prepared. The pH of this solution and the aqueous emulsion is adjusted to at least 9 with the volatile amine base and then the solution and emulsion are mixed together to form the cleaning and polishing composition of this invention.

CASTING THE POLISH FILM

The cleaning and polishing composition of this invention can be used on most floor coverings such as linoleum, vinyl tile and vinyl asbestos tile. It it not suitable for use on wood. The polish film is cast by merely applying the liquid composition to the floor in a well-known manner, e.g., with a sponge or applicator. As the polish film is cast, the floor is cleaned due to the high pH of the composition and the sequestering and cleaning capacity of E-1-HTP, E-2-HTP, EHDP and/or ETP.

EXAMPLES

The following examples are intended to further explain and illustrate the cleaning and polishing composition of this invention and its application. It should be understood, however, that these examples are not intended to limit the invention in any manner. They are instead set forth to illustrate the preferred components and the preferred amounts of these components which are present in the cleaning and polishing composition of this invention. All parts, percentages and ratios set forth in these examples, the specification and the appended claims are by weight unless otherwise indicated.

Example I

A detergent removable cleaning and polishing composition is prepared from the following components:

| Component: | Parts by weight |
|---|---|
| Terpolymer (the emulsion polymerization product of 7 parts ethylacrylate, 2 parts styrene and 1 part methacrylic acid) (Acid number=15) (Mol. wt.=700,000) | 10 |
| EHDP monohydrate | 0.59 |
| Calcium chloride dihydrate | 0.025 |
| Water | 90 |

The composition is prepared by making an aqueous emulsion of the terpolymer and water and separately making an aqueous solution of the EHDP and calcium chloride. Both the pH of the emulsion and the pH of the solution are adjusted to 10 with ammonium hydroxide. Then the emulsion and the solution are mixed together to form the finished polish composition.

This cleaning and polishing composition is suitable for use on linoleum, vinyl tile and vinyl asbestos tile. On drying, the polish film is water resistant but is readily removable by subsequent applications of the cleaning and polishing composition itself, ammonium hydroxide or other relatively strong base, or by aqueous solutions of ordinary detergent compositions.

Example II

A detergent removable cleaning and polishing composition was prepared from the following components:

| Component: | Parts by weight |
|---|---|
| Terpolymer (the emulsion polymerization product of 5 parts of ethylacrylate, 4 parts styrene and 1 part methacrylic acid) (Acid number=15) (Mol. wt.=700,000) | 10 |
| Resin acid [an aqueous emulsion containing 13% of copolymer of styrene and maleic anhydride (SMA 3000A resin produced by Sinclair)] (Acid number=275) | 16 |
| Polyethylene [ an aqueous emulsion containing 15% of polyethylene (Polyethylene AC–629 produced by Allied Chemical)] | 13.5 |
| Tributoxyethylphosphate | 0.74 |
| Ethylene glycol | 0.58 |
| Monoethyl ether of diethylene glycol (Carbitol) | 0.58 |

Fluorochemical leveling agent (an aqueous solution containing 1% FC-128 produced by
Minnesota Minning & Manufacturing Co.)__ 0.35
EHDP monohydrate _____ 0.59
Calcium chloride dihydrate _____ 0.025
Water _____ 58

The polymer emulsion was placed in a mixing tank equipped with a stirring apparatus. The aqueous emulsions of the resin acid and the polyethylene were slowly added to the polymer emulsion and thoroughly mixed therewith. The Carbitol, ethylene glycol and tributoxyethylphosphate were diluted with equal portions of water and then these components and the FC-128 were added to the emulsion described above. A separate aqueous solution of the calcium chloride dihydrate and the EHDP monohydrate was prepared. The pH of the solution and the pH of the aqueous emulsion were adjusted to 9.5 with ammonium hydroxide. Then the solution and emulsion were mixed together to form the final cleaning and polishing composition.

The above-described cleaning and polishing composition is especially formulated for use on linoleum, vinyl tile and vinyl asbestos tile. This composition is especially efficient for cleaning soiled floors, particularly those soiled with high fat soils. Films cast from this cleaning and polishing composition were resistant to water and did not water spot but were easily removed from the floor covering by gentle scrubbing with subsequent applications of the cleaning and polishing composition, 1% solutions of ammonium hydroxide or other dilute base, or 1% solutions of ordinary detergent compositions, e.g., Tide®.

Example III

Substantially the same results as in Examples I and II are obtained when equivalent amounts of E-1-HTP, E-2-HTP and ETP are substituted for EHDP monohydrate. These same results are obtained when morpholine or ethanolamine are substituted for ammonium hydroxide. Substantially similar results to those obtained in Examples I and II are obtained when equivalent amounts of the following water-soluble compounds are substituted for calcium chloride: calcium hydroxide, calcium nitrate, calcium acetate, magnesium chloride, magnesium hydroxide, magnesium acetate and magnesium nitrate, barium and strontium chloride, barium and strontium hydroxide, barium and strontium nitrate, and barium and strontium acetate.

When the second, fourth, fifth, sixth and seventh polymers shown in Table II, columns 11 and 12 of U.S. Pat. 3,308,078 are substituted for the polymer shown in Example II, substantially the same results are attained. When the resins listed at column 14, lines 10 through 45 are substituted for the SMA 3000A resin in Example II, substantially the same results are obtained. When A-C polyethylene 729, A-C polyethylene 630 and Epolene E are substituted for A-C polyethylene 629 in Example II, substantially the same results are obtained.

The foregoing description of the invention has been presented describing certain operable and preferred embodiments. It is not intended that the invention should be so limited since variations and modifications thereof will be obvious to those skilled in the art, all of which are within the spirit and scope of this invention.

What is claimed is:
1. A detergent removable cleaning and polishing composition comprising by weight of the composition:
  (1) from about 5% to about 30% of a polymer having an acid number ranging from about 10 to about 60; said polymer being comprised by weight of from about 5% to about 35% carboxyl-containing ethylenically unsaturated polymerizable monomers and from about 65% to about 95% of carboxyl-free ethylenically unsaturated polymerizable monomers;
  (2) from about 0.005% to about 0.3% of a crosslinking agent selected from the group consisting of water-soluble calcium, magnesium, barium, and strontium compounds;
  (3) from about 0.2% to about 1.2% of a phosphonate chelating agent selected from the group consisting of ethane - 1 - hydroxy - 1,1,2 - triphosphonic acid, ethane - 2 - hydroxy - 1,1,2 - triphosphonic acid, ethane - 1 - hydroxy - 1,1 - diphosphonic acid, and ethane - 1,1,2 - triphosphonic acid;
  (4) from about 65% to about 90% of water; and
  (5) sufficient volatile base to adjust the pH of the composition to from about 9 to about 12.
2. The composition of claim 1 wherein the polymer has a molecular weight ranging from about 44,000 to about 1,000,000 and an acid number ranging from about 10 to about 30.
3. The composition of claim 1 wherein the polymer has the general formula:

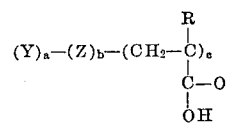

wherein Y is an acrylate selected from the group consisting of 2-ethylhexyl acrylate, butylacrylate and ethyl acrylate; Z is selected from the group consisting of styrene, acrylonitrile, vinyl toluene, ethylmethacrylate, methylmethacrylate or butylmethacrylate; R is selected from the group consisting of hydrogen and methyl; and wherein $a$, $b$, and $c$ are so selected as to obtain a total molecular weight of between about 44,000 and about 1,000,000, and wherein $a$ and $b$ are so selected that the combination of Y and Z equal from about 75% to about 95% by weight of the total polymer and $c$ is so selected that acrylic acid, methacrylic acid or mixtures thereof comprise from 5% to 25% of the total weight of the polymer.
4. The composition of claim 3 wherein the polymer is comprised of: (1) from about 5% to about 15% of methacrylic acid; (2) from about 10% to about 70% of ethylacrylate, butylacrylate or mixtures thereof; and (3) from about 10% to about 70% of styrene, methylmethacrylate, acrylonitrile or mixtures thereof.
5. The composition of claim 1 wherein the volatile base is selected from the group consisting of ammonium hydroxide, morpholine and ethanolamine.
6. The composition of claim 5 wherein the volatile base is ammonium hydroxide.
7. The detergent removable cleaning and polishing composition of claim 1 comprising by weight of the composition:
  (1) from about 8% to about 12% of the polymer of claim 1 (1);
  (2) from about 0.015% to about 0.075% of the crosslinking agents of claim 1 (2);
  (3) from about 0.5% to about 1.2% of the phosphonate chelating agents of claim 1 (3);
  (4) from about 75% to about 85% of water; and
  (5) sufficient volatile base to adjust the pH of the composition to from about 9.5 to about 12.
8. The composition of claim 1 comprising:
  (1) from about 5% to about 30% of a polymer having an acid number ranging from about 10 to about 60; said polymer being comprised by weight of from about 5% to about 35% carboxyl-containing ethylenically unsaturated polymerizable monomers and from about 65% to about 95% of carboxyl-free ethylenically unsaturated polymerizable monomers;
  (2) from 0% to about 5% of alkali soluble resins containing carboxyl groups and having molecular weights of up to about 10,000, selected from the group consisting of:
    (a) condensation type resins having acid numbers ranging from about 120 to about 220, (b) addition type resins having acid numbers ranging from about 140 to about 300 containing at least two ethylenically unsaturated monomers, and (c) mixtures of said condensation type resins and addition type resins;

(3) from 0% to about 5% of polyethylene characterized by an essentially polyethylenic structure formed of recurring methylene groups, by a molecular weight between about 1000 and about 5000, by an oxygen content between about 1% and about 17%, by a hardness equal to a penetration of not more than 1.5 mm. as measured by standard ASTM method D–5–25, by a toughness equal to at least 2 foot pounds per linear inch as measured by a standard ASTM method D–256–47–P, and by a low ratio of saponification number to acid number;

(4) from about 0.005% to about 0.3% of a crosslinking agent selected from the group consisting of calcium chloride and magnesium chloride;

(5) from about 0.2% to about 1.2% of a phosphonate chelating agent selected from the group consisting of ethane - 1 hydroxy - 1,1,2 - triphosphonic acid, ethane - 2 - hydroxy - 1,1,2 - triphosphonic acid, ethane - 1 - hydroxy - 1,1 - diphosphonic acid, and ethane-1,1,2-triphosphonic acid;

(6) from 0% to about 0.01% of a fluorochemical leveling agent having the formula:

$$(C_aX'_{2a+1})_f Z$$

wherein $a$ is a small number of 6–12, $X'$ is a member of the class consisting of hydrogen and fluorine atoms with the groups $C_aX'_{2a+1}$ having at least 55% by weight of fluorine atoms, $f$ is a small whole number of 1–8, and $Z$ is a radical such that the compound $(C_aX'_{2a+1})_f Z$ is water soluble;

(7) from 0% to about 1% of mono- and/or dialkyl ether of diethylene glycol, wherein the alkyl groups contain from 1 to about 4 carbon atoms;

(8) from 0% to about 1% of ethylene glycol;

(9) from 0% to about 1.5% of tributoxyethylphosphate;

(10) from about 65% to about 90% water; and

(11) sufficient volatile base to raise the pH of the composition to from about 9 to about 12.

9. The composition of claim 8 which is comprised of:

(1) from about 8% to about 12% of the polymer of claim 8 (1) having an acid number ranging from about 13 to 17;

(2) from about 2% to about 2.8% of the resins of claim 8 (2);

(3) from about 1% to about 2% of the polyethylene of claim 8 (3);

(4) from about 0.015% to about 0.075% of the crosslinking agents of claim 8 (4);

(5) from about 0.5% to about 0.7% of the phosphonate chelating agents of claim 8 (5);

(6) from about 0.002% to about 0.005% of the fluorochemical leveling agent of claim 8 (6);

(7) from about 0.5% to about 0.7% of monoethyl ether or diethyl ether of diethylene glycol;

(8) from about 0.5% to about 0.7% of ethylene glycol;

(9) from about 0.65% to about 0.85% of tributoxyethylphosphate;

(10) from about 75% to about 85% water; and

(11) sufficient volatile amine base to raise the pH of the composition to from about 9.5 to about 12.

References Cited

UNITED STATES PATENTS

| | | | |
|---|---|---|---|
| 3,328,325 | 6/1967 | Zdanowski | 260—28.5 |
| 3,328,328 | 6/1967 | Scanley | 260—28.5 |
| 3,352,805 | 11/1967 | Lima | 260—28.5 |
| 3,373,127 | 3/1968 | Bean et al. | 260—28.5 |
| 3,380,944 | 4/1968 | Kay et al. | 260—28.5 |
| 3,440,188 | 4/1969 | Burdick et al. | 260—8 |
| 3,450,657 | 6/1969 | Mellan et al. | 260—28.5 |
| 3,451,937 | 6/1969 | Quimby | 252—137X |
| 3,457,208 | 6/1969 | Sullivan et al. | 260—28.5 |
| 3,463,835 | 8/1969 | Budnick | 260—30.6 |
| 3,467,610 | 9/1969 | Fiarman et al. | 260—28.5 |

JAY H. WOO, Primary Examiner

U.S. Cl. X.R.

252—89, 152; 260—29.6, 30.6